(12) United States Patent
Fang

(10) Patent No.: US 8,738,561 B2
(45) Date of Patent: May 27, 2014

(54) BUT REASONING IN INCONSISTENT KNOWLEDGE BASE

(75) Inventor: Jun Fang, Shaanxi (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/818,305

(22) PCT Filed: Jul. 29, 2011

(86) PCT No.: PCT/CN2011/077784
§ 371 (c)(1),
(2), (4) Date: Feb. 22, 2013

(87) PCT Pub. No.: WO2013/016854
PCT Pub. Date: Feb. 7, 2013

(65) Prior Publication Data
US 2013/0151459 A1    Jun. 13, 2013

(51) Int. Cl.
*G06N 5/02* (2006.01)

(52) U.S. Cl.
USPC .......................................................... 706/50

(58) Field of Classification Search
USPC .......................................................... 706/50
See application file for complete search history.

(56) References Cited

U.S. PATENT DOCUMENTS

| 7,363,299 B2 * | 4/2008 | Dalvi et al. ............................ 1/1 |
| 2009/0030856 A1 | 1/2009 | Arena et al. |
| 2010/0223224 A1 | 9/2010 | Kleer et al. |

FOREIGN PATENT DOCUMENTS

| CN | 1794240 A | 6/2006 |
| CN | 1916898 A | 2/2007 |
| WO | 2008118900 A1 | 10/2008 |

OTHER PUBLICATIONS

Ikuo Tahara et al., "Three-Valued Logic for Reasoning from an Inconsistent Knowledge Base", Systems and Computers in Japan, 2006, pp. 44-51, vol. 37, No. 14, Wiley Periodicals, Inc.
Yue Ma et al., "Algorithms for Paraconsistent Reasoning with OWL", In: Proceedings of the 4th European Semantic Web Conference, 2007, pp. 399-413.
Zhisheng Huang et al., "Reasoning with Inconsistent Ontologies: Framework and Prototype", SEKT Deliverable D3.4.1, 2004, Dec. 31, 2004, 31 pages.
Guilin Qi et al., "Extending Description Logics with Uncertainty Reasoning in Possibilistic Logic", In: the Proceedings of the 9th European Conference on Symbolic and Quantitave Approaches to Reasoning with Uncertainty, 2007, pp. 828-839.
Jianfeng Du et al., "Lexicographical Inference Over Inconsistent DL-based Ontologies", In: Proceedings of the 2nd International Conference on Web Reasoning and Rule Systems. 2008 , pp. 1-28.
Sergio Alejandro Gomez et al., "An Argumentative Approach to Reasoning with Inconsistent Ontologies", Knowledge Representation Ontology Workshop, 2008, pp. 11-20, vol. 90, Sydney, Australia.

(Continued)

*Primary Examiner* — Kakali Chaki
*Assistant Examiner* — Mai T Tran
(74) *Attorney, Agent, or Firm* — Ren-Sheng International

(57) ABSTRACT

A method is provided for "but reasoning" with an inconsistent knowledge base. The method not only gives an answer to a Boolean question but also additional and instructive information. The method first finds a bridge statement that explains a contradiction between the answer and the inconsistent knowledge base. The method then selects a but statement that causes the contradiction with the answer, and constructs and validates a but answer with the answer, the but statement, and optionally the bridge statement.

20 Claims, 5 Drawing Sheets

(56) References Cited

OTHER PUBLICATIONS

Tim Berners-Lee et al., "The Semantic Web", Scientific American, May 17, 2001, 5 pages.

Yue Ma et al., "Paraconsistent Reasoning with OWL 2", In: Proceedings of the 3rd International Conference on Web Reasoning and Rule Systems, 2009, pp. 197-211.

Zhisheng Huang et al., "Reasoning with Inconsistent Ontologies": In: Proceedings of the International Joint Conference on Artificial Intelligence, 2005, vol. 5, pp. 254-259.

Zhisheng Huang et al., "Using Semantic Distances for Reasoning with Inconsistent Ontologies", In: Proceedings of the International Semantic Web Conference, 2008, Lecture Nots in Computer Science 5318, pp. 178-194.

Wilfrid Hodges, "Classical Logic I: First-Order Logic", The Blackwell Guide to Philosophical Logic, 2001, Chapter 1 pp. 9-32.

Jun Fang, "Contrastive Reasoning with Inconsistent Ontologies", Web Intelligence and Intelligent Agent Technology, 2011, pp. 191-194, Date of Conference: Aug. 22-27, 2011.

"Kalman Filter", http://en.wikipedia.org/w/index.php?oldid=392033605, edited by MrOllie on Oct. 21, 2010.

Notification of Transmittal of the International Search Report and the Written Opinion of the International Searching Authority, May 3, 2012.

Yang et al., "Abstract of Online Recursive Algorithm for Short-Term Traffic Prediction", Transportation Research Record, Issue No. 1879, 2004.

Survanil Ghosh, "Paraconsistency and Beyond: A New Approach to Inconsistency Handling," Methodologies for Intelligent Systems Lecture Notes in Computer Science, 1994, pp. 531-540, vol. 869.

\* cited by examiner

A computer product 400

Signal bearing medium 402

At least one or more instructions 404 for:

receiving a Boolean query including an original formula;

determining if an inconsistent knowledge base non-standardly entails the original formula;

when the inconsistent knowledge base non-standardly entails the original formula, selecting a bridge formula from the inconsistent knowledge base, wherein the bridge formula explains why a contradiction with the original formula occurs in the inconsistent knowledge base;

constructing a but answer comprising the original formula, a but formula, and the bridge formula, wherein the but formula causes the contradiction with the original formula;

validating the but answer; and transmitting or displaying the but answer with at least the original formula and the but formula.

| A computer-readable medium 406 | A recordable medium 408 | A communication medium 410 |

FIG. 4

BUT REASONING IN INCONSISTENT KNOWLEDGE BASE

CROSS-REFERENCE TO RELATED APPLICATIONS

The present application is a 371 application of International Application PCT/CN2011/077784, filed on Jul. 29, 2011 and entitled "BUT REASONING IN INCONSISTENT KNOWLEDGE BASE." The International Application, including any appendices or attachments thereof, is incorporated by reference herein in its entirety.

BACKGROUND

Unless otherwise indicated herein, the approaches described in this section are not prior art to the claims in this application and are not admitted to be prior art by inclusion in this section.

Semantic Web refers to making the information available on the World Wide Web understandable to machines. Instead of a user processing and manipulating information on the World Wide Web, a personal agent on a computer would exploit the data for the user to perform a task, such as answering a Boolean query. However, there exits many knowledge bases on the World Wide Web and merging them quickly leads to inconsistencies.

Generally there are two methods to deal with inconsistencies in knowledge bases. The first method is to repair the inconsistent knowledge bases. However, it may be ineffective or even impossible to repair inconsistencies as the inconsistent knowledge bases may be too large or one may not have the right to repair the inconsistencies. Furthermore, the inconsistent knowledge bases may change at high frequency and therefore not allow for any meaningful repair. The second method to deal with inconsistent knowledge bases is to directly perform reasoning with the inconsistent knowledge bases. There are several works on reasoning with inconsistency. Given a Boolean query, these reasoning methods usually return "yes," "no," or "I don't know."

SUMMARY

In one or more embodiments of the present disclosure, a method is provided for a processor to respond to a Boolean query using an inconsistent knowledge base. The method includes receiving the Boolean query with an original formula and determining if the inconsistent knowledge base non-standardly entails the original formula. When the inconsistent knowledge base non-standardly entails the original formula, the method includes selecting, from the inconsistent knowledge base, a bridge formula that explains a contradiction with the original formula, and constructing a but answer comprising the original formula, a but formula that causes the contradiction with the original formula, and the bridge formula. The method further includes validating the but answer and transmitting or displaying the but answer with at least the original formula and the but formula.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

In the drawings:

FIG. 4 shows an illustrative computer program product for implementing a method for but reasoning with an inconsistent knowledge base.

DETAILED DESCRIPTION

I. Introduction

Figure 1:
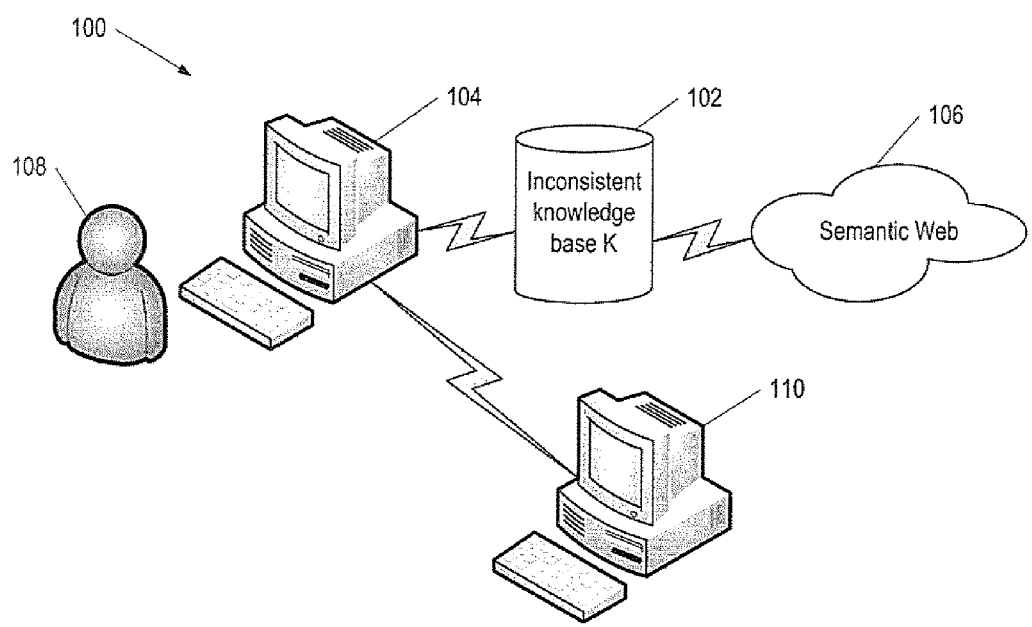
FIG. 1 is a block diagram of an illustrative system of computers for implementing but reasoning with an inconsistent knowledge base.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

This disclosure is drawn, inter alia, to methods, apparatus, computer programs and systems related to using "but reasoning" to determine a "but answer" to a Boolean query from an inconsistent knowledge base.

The word "but" may be used to express a contrary conjunction of two clauses, and reasoning with such a but statement may be called but reasoning. When answering a Boolean query from an inconsistent knowledge base, but reasoning may give not only an "original answer" to a Boolean query but also a "contrasting answer" that contrasts the original answer.

But reasoning has two main goals. But reasoning may avoid misleading information by providing a relevant contrasting answer. For example, one may say "all cars are polluting but electric cars are not polluting." The simple answer that all cars are polluting is misleading because electric cars are an exception to this rule. But reasoning may also achieve effective influence with an additional answer that is unexpected. For example, one may say "the conference will be held in Holland, but not in Amsterdam." The contrastive answer that the conference will not be in Amsterdam is surprising against the normal expectation that all conferences in Holland will be in Amsterdam.

But reasoning may expose contradictions between a knowledge base and external expectations (as in the conference example), or contradictions between different parts of the knowledge base (as in the polluting cars example). For these reasons, but reasoning may be useful for reasoning with an inconsistent knowledge base because it does not simply respond to a Boolean query with a Boolean answer of "yes," "no," or "I don't know," but it provides an informative but answer with some "surprising" information.

II. Formalization of but Reasoning

The classical, standard entailment in logics is explosive: any formula is a logical consequence of a contradiction. Therefore, conclusions drawn from an inconsistent knowledge base by classical inference may be completely meaningless. The general task of any system that reasons in an inconsistent knowledge base is as follows: given an inconsistent knowledge base, return "meaningful" answers to queries. An answer is "meaningful" if it is supported by a selected consistent subset of the inconsistent knowledge base while its negation is not supported by the consistent subset. In the following, the notation $\models$ denotes the standard entailment, and the notation $\approx$ denotes a nonstandard entailment.

A nonstandard entailment $\approx$ should satisfy soundness and meaningfulness. "Soundness" means formulas follow from an inconsistent knowledge base $\mathcal{O}$ follow from a consistent subset of the inconsistent knowledge base using classical reasoning. Meaningfulness of the nonstandard entailment means all answers entailed are meaningful.

Properties of $\approx$ are similar to those of the standard entailment $\models$. However, there is an important exception. Given an inconsistent knowledge base $\mathcal{O}$ and two formulas $\alpha$ and $\beta$ with $\mathcal{O} \approx \alpha$ and $\mathcal{O} \approx \beta$, it cannot always be concluded that $\mathcal{O} \approx \alpha \wedge \beta$. One reason for this is that the selected subset that supports $\mathcal{O} \approx \alpha$ may differ from the selected subset that supports $\mathcal{O} \approx \beta$, while the union of the two subsets may be inconsistent; another reason is that $\alpha \wedge \beta$ may be a contradiction.

The notion of nonstandard entailment may be used to define the central notion of but answers. Informally, a but answer may include three parts:

Original formula: A formula which answers the original query;

But formula: A formula which contrasts with the original answer formula;

Bridge formula: A formula that explains the reason why the contradiction occurs between the original formula and the but formula. The clarification formula need not (but may) be implied by the knowledge base. In some application scenarios, the clarification formulas may be omitted in the but answer if the user does not require an explanation of contrastive answers.

Note that formulas in the present disclosure refer to first-order logic (FOL) formulas. Without loss of generality, a description logic (DL) axiom can be transformed into a (conjunctive) FOL formula. In the following, only a single formula will be considered as many formulas may be transformed into a single formula using conjunction.

The above leads to the formal definition of a but answer.

Definition 1 (But Answer): Given an inconsistent knowledge base $\mathcal{O}$, a but answer $\mathcal{O} \approx \alpha$ but $\gamma$ although $\beta$ contains the following parts: an original formula $\alpha$, a but formula $\gamma$, and a bridge formula $\beta$, such that: $\mathcal{O} \approx \alpha$, $\mathcal{O} \approx \beta$ and $\mathcal{O} \approx \gamma$, $\alpha \wedge \beta$ is not a contradiction, $\beta \wedge \gamma$ is not a contradiction, but $\alpha \wedge \beta \wedge \gamma$ is a contradiction (i.e., $\alpha \wedge \beta \wedge \gamma \models \bot$).

Note that the bridge formula may be left out of a but answer but a but answer is only contrastive if a bridge formula exists. Further note a formula is a contradiction if and only if (iff) there does not exist a model that can satisfy the formula, and a knowledge base is inconsistent iff there does not exist a model that can satisfy all formulas in the knowledge base.

Definition 2 (But Answer without Explanation): Given an inconsistent knowledge base $\mathcal{O}$, $\mathcal{O} \approx \alpha$ but $\gamma$ is a but answer without explanation if there exists a bridge formula $\beta$ such that $\mathcal{O} \approx \alpha$ but $\gamma$ although $\beta$ is a but answer.

The definitions above imply that but answers have a nice exchange property. Namely, more but answers can be obtained by exchanging the original formula, the but formula, and the bridge formula.

Proposition 1 (Exchange Property of But Answers): For an inconsistent knowledge base $\mathcal{O}$ and three formulas $\alpha, \beta, \gamma$, the following holds:

Exchange: $\mathcal{O} \approx \alpha$ but $\gamma$ although $\beta \Rightarrow \mathcal{O} \approx \gamma$ but $\alpha$ although $\beta$;

Conditional Lifting: $\mathcal{O} \approx \alpha$ but $\gamma$ although $\beta$ and $\alpha \wedge \gamma$ is not a contradiction $\Rightarrow \mathcal{O} \approx \beta$ but $\gamma$ although $\alpha$;

Conditional Shifting: $\mathcal{O} \approx \alpha$ but $\gamma$ although $\beta$ and $\alpha \wedge \gamma$ is not a contradiction $\Rightarrow \mathcal{O} \approx \alpha$ but $\beta$ although $\gamma$.

Except for the exchange properties above, but answers also have the following other properties.

Firstly, the formulas in a but answer can be expanded with the conjunction operator $\wedge$. For instance, "Penguins are birds," but "Penguins cannot fly" is a but answer, so "Penguins have flippers" and "Penguins are birds," but "Penguins cannot fly" is also a but answer.

Secondly, in a but answer, the original formula, the but formula, and the bridge formula together has the following property: one formula and conjunction of other two formulas can be resolved. For instance, in the Penguin example, "Penguins are birds," but "Penguins cannot fly," although "All birds can fly," the original formula is "Penguins are birds" and the conjunction of the bridge formula and the but formula is "All birds can fly" and "Penguins cannot fly." It is easy to see that birds is in the original formula while $\neg$ birds is in the conjunction as all birds can fly means something can either fly or is not a bird.

Thirdly, given a but answer $\mathcal{O} \approx \alpha$ but $\gamma$ although $\beta$, for any formula in it, say $\alpha$, there exists a formula $\neg \Phi$ that is entailed by $\{\beta, \gamma\}$, $\Phi$ is entailed by $\alpha$, $\neg \alpha$ contradicts with $\alpha$. The contradiction is the reason why the sentence "$\alpha$ but $\gamma$" surprises people.

Base on the analysis above, these additional properties of but answers are formalized as follows:

Proposition 2 (Additional Properties of But Answers): Given an inconsistent knowledge base $\mathcal{O}$ and three formulas $\alpha, \beta, \gamma$, 1.1) $\mathcal{O} \approx \alpha$ but $\gamma$ although $\beta$ and $\alpha \wedge \alpha' \wedge \beta$ is not a contradiction and $\mathcal{O} \approx \alpha \wedge \alpha' \Rightarrow \mathcal{O} \approx \alpha \wedge \alpha'$ but $\gamma$ although $\beta$ (Expansion), where $\alpha'$ is an arbitrary formula;

1.2) $\mathcal{O} \approx \alpha$ but $\gamma$ although $\beta$ and $\alpha \wedge \beta \wedge \beta'$ is not a contradiction and $\beta \wedge \beta' \wedge \gamma$ is not a contradiction and $\mathcal{O} \approx \beta \wedge \beta' \Rightarrow \mathcal{O} \approx \alpha$ but $\gamma$ although $\beta \wedge \beta'$ (Expansion), where $\beta'$ is an arbitrary formula;

1.3) $\mathcal{O} \approx \alpha$ but $\gamma$ although $\beta$ and $\beta \wedge \gamma \wedge \gamma'$ is not a contradiction and $\mathcal{O} \approx \gamma \wedge \gamma' \Rightarrow \mathcal{O} \approx \alpha$ but $\gamma \wedge \gamma'$ although $\beta$ (Expansion), where $\gamma'$ is an arbitrary formula;

2) $\mathcal{O} \approx \alpha$ but $\gamma$ although $\beta \Rightarrow \alpha$ and $\beta \wedge \gamma$ can be resolved (Resolution);

3) $\mathcal{O} \approx \alpha$ but $\gamma$ although $\beta \Rightarrow \exists \Phi(\{\beta, \gamma\} \models \neg \Phi$ and $\alpha \models \Phi)$ (the Reason of Surprise).

Note that two formulas in conjunctive normal form (CNF) can be resolved iff there exists an atomic formula A such that A is in one of these CNF formulas and $\wedge$ A is in the other.

III. Implementation

In one or more embodiments of the present disclosure, the method may determine if an inconsistent knowledge base non-standardly entails an original formula. When the inconsistent knowledge base non-standardly entails the original formula, the method may select a bridge formula from the inconsistent knowledge base that can be resolved with and does not contradict the original formula. The method may select a but formula that is a resolvent of the original formula and the bridge formula. The method may generate a but answer including the original formula and the but formula, and then validate the but answer by confirming the knowledge base non-standardly entails the but formula.

FIG. 1 is a block diagram of an illustrative system 100 of computers for implementing but reasoning with an inconsistent knowledge base in one or more embodiments of the present disclosure. System 100 includes a storage 102 with an inconsistent knowledge base K and a computer 104. Inconsistent knowledge base K represented as a set of FOL formulas. The FOL formulas may be gathered, derived, or otherwise obtained from a computer network 106 such as the World Wide Web. Storage 102 may be a local storage of computer 104 or a remote storage accessible through another computer over a computer network. Computer 104 includes processor and memory to run a software application, referred to as an inconsistent reasoner, that uses but reasoning to determine a but answer to a Boolean query from inconsistent knowledge base K. The Boolean query may originate from another software application on computer 104, a user 108, or another machine 110.

Figure 2:
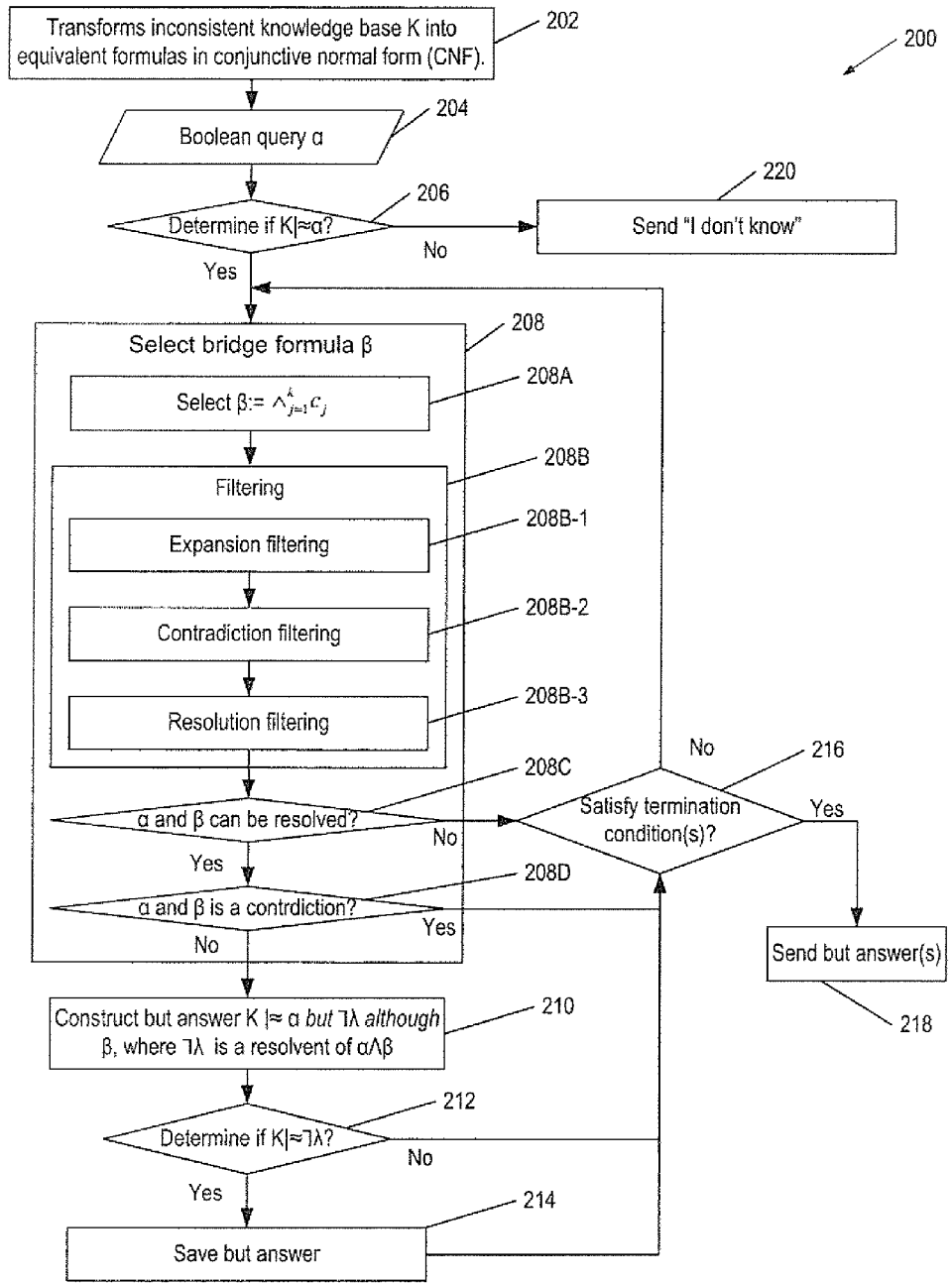
FIG. 2 is a flowchart of an illustrative method executed by a computer of FIG. 1 to implement the inconsistent reasoner that determines a but answer to a Boolean query from an inconsistent knowledge base.

FIG. 2 is a flowchart of an illustrative method 200 executed by computer 104 to implement the inconsistent reasoner that determines a but answer to a Boolean query from inconsistent knowledge base K in one or more embodiments of the present disclosure. Method 200 may include one or more operations, functions, or actions illustrated by blocks. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

A running example based on a Mad Cow knowledge base is used to explain method 200. In the Mad Cow knowledge base, an inconsistency exists as a mad cow is defined as a cow that eats brains of sheep and a cow is defined as a vegetarian. The FOL formulas in the Mad Cow knowledge base are represented as DL axioms listed below in Table 1.

TABLE 1

α1: Cow⊑ Vegetarian
α2: MadCow⊑ Cow
α3: MadCow⊑∃Eat.BrainofSheep (i.e., MadCow is a subclass of a class where some elements in the class eat brain of sheep)
α4: Sheep⊑ Animal
α5: BrainofSheep⊑ Brain
α6: Brain⊑ PartofAnimal
α7: Vegetarian⊑∀eat.¬Animal (i.e., Vegetarian is a class where all elements in the class do not eat animals)
α8: Vegetarian⊑∀eat.¬PartofAnimal (i.e., Vegetarian is a class where all elements in the class does not eat part of animal)
α9: MadCow(Dazy)

where⊑denotes concept inclusion, ∃ denotes the existential quantifier (there exists a value), ∀ denotes the universal quantifier (for all values), and¬denotes negation.

Method 200 may begin at block 202. In block 202, computer 104 transforms the FOL formulas in inconsistent knowledge base K into equivalent CNF formulas. A CNF formula is a conjunction of "clauses," each of which is a disjunction of "literals." Hence, inconsistent knowledge base K can be represented as $c_0 \wedge c_1 \wedge \ldots \wedge c_i \wedge \ldots$, where clause $c_i$ is $\rho_1 \vee \rho_2 \vee \ldots$, literal $\rho_i$ is either an atomic formula or a negation of an atomic formula, and ∨ is the disjunction operator. Computer 104 generally performs block 202 offline ahead of receiving any Boolean query. Alternatively, another computer performs block 202 offline ahead of computer 104 receiving any Boolean query. In the running example, the transformed formulas in the Mad Cow knowledge base are listed below in Table 2.

TABLE 2

α1:¬Cow(x)∨ Vegetarian(x)
α2:¬MadCow(x)∨ Cow(x)
α3:¬MadCow(x)∨ eat(x ,f (x))∧¬ MadCow(x)∨ BrainofSheep(f(x))
α4:¬Sheep(x)∨ Animal(x)
α5:¬BrainofSheep(x)∨ Brain(x)
α6:¬Brain(x)∨ PartofAnimal(x)
α7:¬Vegetarian(x)∨¬ eat(x , y)∧¬ Vegetarian(x)∨¬ Animal(y)
α8:¬Vegetarian(x)∨¬ eat(x , y)∧¬ Vegetarian(x)
∨¬ PartofAnimal(y)
α9: MadCow(Dazy)

Block 202 may be followed by block 204.

In block 204, computer 104 receives a Boolean query α where α is the original formula. In the running example, original formula α is Cow(Dazy) so the Boolean query α represents "is Dazy a cow?". Block 204 may be followed by block 206.

In block 206, computer 104 determines if inconsistent knowledge base K non-standardly entails original formula α (i.e., K⊫α). To determine if inconsistent knowledge base K non-standardly entails original formula α, computer 104 selects a subset Σ" from inconsistent knowledge base K that standardly entails original formula α (i.e., Σ"⊨α). Computer 104 selects only formulas that are relevant to original formula α. There are many methods to determine non-standard entailment. Although one method for non-standard entailment is described herein, other methods may be used.

Figure 3:
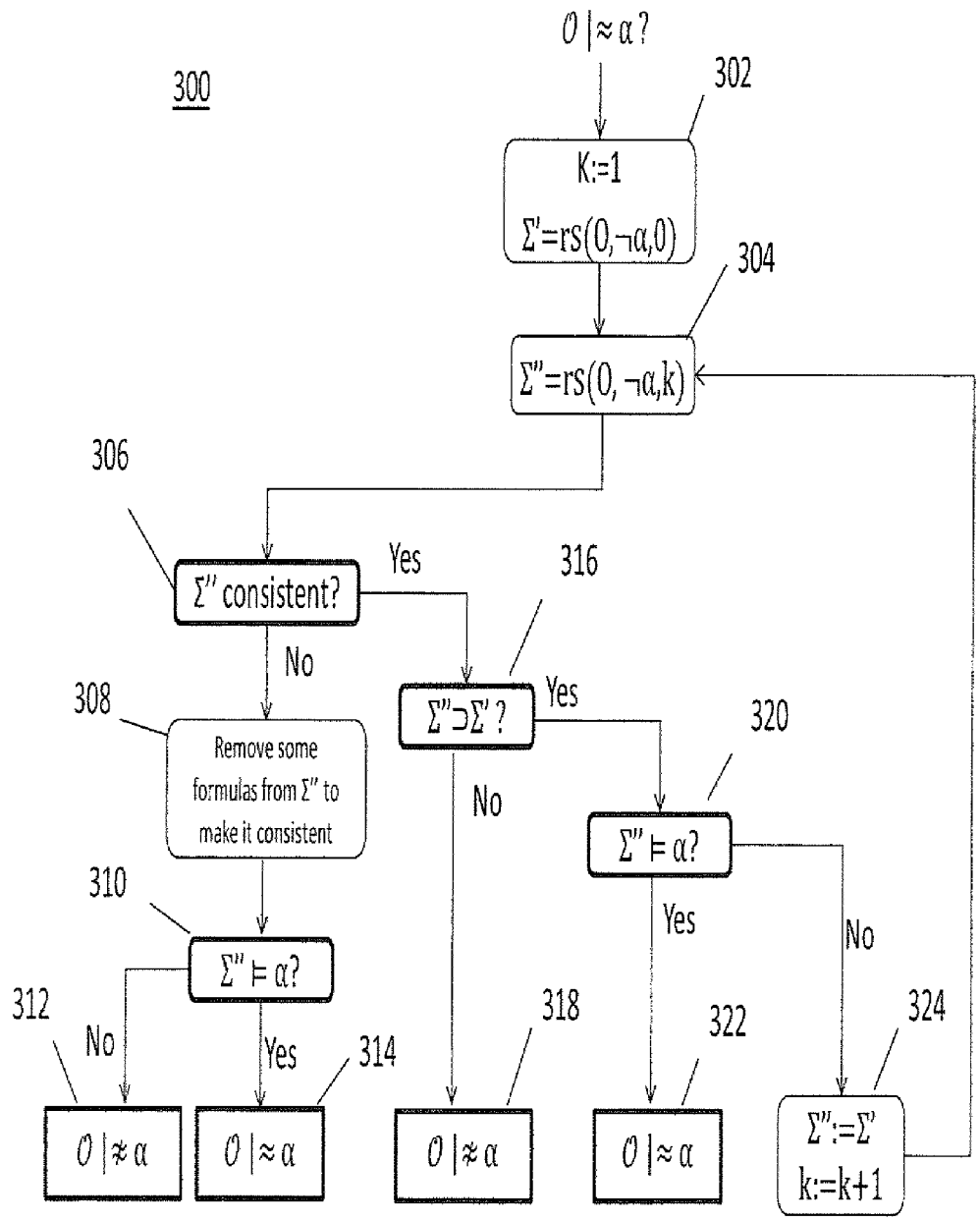
FIG. 3 is a flowchart of an illustrative method executed by the computer of FIG. 1 to determine if the inconsistent knowledge base non-standardly entails an original formula.

FIG. 3 is a flowchart of an illustrative method 300 executed by computer 104 to determine if inconsistent knowledge base K non-standardly entails the original formula α in one or more embodiments of the present disclosure. According to the resolution technique, only formulas that can be directly or indirectly resolved with the negation of a Boolean query formula can influence the entailment result. Hence, method 300 uses a selection function "rs" to add formulas that can be resolved with the negation of original formula α to a subset Σ" until subset Σ" contains all resolvably relevant formulas or is inconsistent. When subset Σ" becomes inconsistent, method 300 performs a breadth-first search in the last added formula(s) with a decreasing cardinality until subset Σ" resumes its consistency. Finally, method 300 determines if subset Σ" entails original formula α to determine if inconsistent knowledge base K non-standardly entails original formula α. Method 300 begins in block 302.

In block 302, computer 104 initializes a pass count k to 1 an initial subset Σ'. Block 302 may be followed by block 304.

In block 304, computer 104 uses selection function rs to add formulas from inconsistent knowledge base K to initial subset Σ' to form subset Σ" for the current pass. Block 304 may be followed by block 306.

In block 306, computer 104 determines if subset Σ" is consistent. If no, block 306 may be followed by block 308. Otherwise block 306 may be followed by block 316.

In block 308, computer 104 removes one or more formulas from subset Σ" to make it consistent. As described above, computer 104 performs a breadth-first search in the last added formula(s) with a decreasing cardinality until subset Σ" resumes its consistency. Block 308 may be followed by block 310.

In block 310, computer 104 determines if subset $\Sigma''$ standardly entails original formula $\alpha$ (i.e., $\Sigma'' \models \alpha$?). If not, block 310 may be followed by block 312. Otherwise block 310 may be followed by block 314.

In block 312, computer 104 determines inconsistent knowledge base K does not non-standardly entail original formula $\alpha$ and ends method 300.

In block 314, computer 104 determines inconsistent knowledge base K non-standardly entails original formula $\alpha$ and ends method 300.

In block 316, computer 104 determines if subset $\Sigma''$ is a superset of initial subset $\Sigma'$. If not, block 316 may be followed by block 318. Otherwise block 316 may be followed by block 320.

In block 318, computer 104 determines inconsistent knowledge base K does not non-standardly entail original formula $\alpha$ and ends method 300.

In block 320, computer 104 determines if subset $\Sigma''$ standardly entails original formula $\alpha$. If so, block 320 may be followed by block 322. Otherwise block 320 may be followed by block 324.

In block 322, computer 104 determines inconsistent knowledge base K non-standardly entails original formula $\alpha$ and ends method 300.

In block 324, computer 104 set initial subset $\Sigma'$ equal to subset $\Sigma''$ and increments pass count k. Block 324 may loop back to block 304 to repeat the above described blocks.

As described above, selection function rs is based on resolvable relevance. Two CNF formulas $\phi$ and $\Phi$ are directly resolvably relevant iff there exists an atomic formula A such that A is in one of these CNF formulas and $\neg A$ is in the other. This may also be referred to as formulas $\phi$ and $\Phi$ having a resolvent res($\phi$ and $\Phi$) or formulas $\phi$ and $\Phi$ can be resolved.

Two CNF formulas $\Phi$ and $\Phi'$ are resolvably k-relevant (k degree indirectly resolvably relevant) with respect to a formula set $\Omega$ iff there exist formulas $\phi_1, \ldots, \phi_k \in \Omega$ such that $\phi$ and $\phi_1$, res($\Phi$, $\phi_1$), and $\phi_2, \ldots,$ and res($\ldots$ (res(res($\phi$, $\phi_1$), $\phi_2$), $\ldots$ ), $\phi_k$) and $\Phi'$ are directly resolvably relevant.

In one or more embodiments of the present disclosure, selection function rs is defined as follows:
rs($\mathcal{O}$, $\Phi$, 0)=$\emptyset$;
rs($\mathcal{O}$, $\Phi$, 1)={$\phi \in K | \Phi$ and $\phi$ are directly resolvably relevant};
rs($\mathcal{O}$, $\Phi$, k)=rs(K, $\Phi$, k)$\cup$\{$\phi \in K | \Phi$ and $\phi$ are directly resolvably k-relevant with respect to rs(K, $\Phi$, k$-$1)\}, for k$>$1.
In other words rs($\mathcal{O}$, $\Phi$, 1) means to select all formulas that are 1-relevant (i.e., directly relevant) to $\Phi$ in the knowledge base $\mathcal{O}$, and rs($\mathcal{O}$, $\Phi$, k) means to select all formulas that are k-relevant to $\Phi$ in the knowledge base $\mathcal{O}$.

In the running example, method 300 determines if $\mathcal{O} \models \alpha$ where $\alpha:=$Cow(Dazy) as follows.
rs($\mathcal{O}$, $\neg\alpha$, 0)=$\emptyset$
rs($\mathcal{O}$, $\neg\alpha$, 1)=\{$\alpha$2\},
it is consistent, and rs($\mathcal{O}$, $\neg\alpha$, 1) $\supset$ rs($\mathcal{O}$, $\neg\alpha$, 0), \{$\alpha$2\}$\not\models\alpha$, go to k=2, continue;
rs($\mathcal{O}$, $\neg\alpha$, 2)=\{$\alpha$2\}$\cup$\{$\alpha$9\}=\{$\alpha$2, $\alpha$9\},
it is consistent, and rs($\mathcal{O}$, $\neg\alpha$, 2) $\supset$ rs($\mathcal{O}$, $\neg\alpha$, 1), \{$\alpha$2, $\alpha$9\}$\models\alpha$,
hence, $\mathcal{O} \approx$Cow(Dazy)

Referring back to FIG. 2, when computer 104 determines inconsistent knowledge base K non-standardly entails original formula $\alpha$, block 206 may be followed by block 208. Otherwise block 206 may be followed by block 220 to return an "I don't know" answer.

In block 208, computer 104 selects bridge formulas $\beta$ from inconsistent knowledge base K. Block 208 includes sub-blocks 208A, 208B (including 208B-1, 208B-2, 208B-3), 208C, and 208D.

In block 208A, computer 104 selects formulas that are non-standardly implied by inconsistent knowledge base K as bridge formulas $\beta$. Observe that if inconsistent knowledge base K non-standardly entails a bridge formula $\beta$ (i.e., K$|\approx\beta$), then bridge formula $\beta$ is a conjunction of some clauses or a resolvent of the conjunction. Hence, computer 104 may use a breadth-first searching method to increasingly select all bridge formulas $\beta$ that are non-standardly entailed by inconsistent knowledge base K.

In the 1st-level (i.e., the first pass through block 208A), computer 104 selects a conjunction of all clauses $c_i$. In the k-level (i.e., the kth pass through block 208A), computer 104 selects a conjunction of k different clauses $\wedge_{j=1}^{k} c_j$. Block 208A may be followed by block 208B.

In block 208B, computer 104 performs filtering. In order to make the selection process more efficient, three filtering methods are introduced to decrease the number of bridge formulas $\beta$, thus make the process more efficient.

In block 208B-1, computer 104 may perform expansion filtering. According to the expansion property of Proposition 2 described above, if K$|\approx\alpha$ but $\gamma$ although $\beta$, then K$|\approx\alpha$ but $\gamma$ although $\beta \wedge c_i$ is also satisfied, where $c_i$ is a clause in inconsistent knowledge base K. Hence, if in the k-level, K$|\approx\alpha$ but $\gamma$ although $\beta$ is satisfied, computer 104 does not select $\beta \wedge c_i$ as a bridge formula in the (k+1)-level.

In block 208B-2, computer 104 may perform contradiction filtering. If in the k-level, a bridge formula $\beta$ satisfies $\alpha \wedge \beta$ is a contradiction, then computer 104 does not select $\beta \wedge c_i$ as a bridge formula in the (k+1)-level as $\beta \wedge c_i$ is also be a contradiction.

In block 208B-3, computer 104 may perform resolution filtering. If a bridge formula $\beta$ and original formula $\alpha$ cannot be resolved, and formulas $\beta'$ and original formula $\alpha$ cannot be resolved, then $\beta \wedge \beta'$ and $\alpha$ cannot be resolved. Therefore computer 104 does not select $\beta \wedge \beta'$ as a bridge formula. Block 208B may be followed by block 208C.

In block 208C, computer 104 checks for a resolution condition on all the bridge formulas selected in the current pass. For each bridge formula $\beta$, computer 104 tests whether original formula $\alpha$ and bridge formula $\beta$ can be resolved. If so, bridge formula $\beta$ is retained and block 208C may be followed by block 208D. When a bridge formula $\beta$ is rejected, block 208C may be followed by block 216 to check if at least one termination condition has been met.

In block 208D, computer 104 checks for a contradiction condition on all the bridge formulas selected in the current pass. For each bridge formula $\beta$, computer 104 tests whether $\alpha \wedge \beta$ is a contradiction. If no, bridge formula $\beta$ is retained and block 208D may be followed by block 210. When a bridge formula $\beta$ is rejected, block 208D may be followed by block 216 to check if at least one termination condition has been met.

In block 210, computer 104 constructs but answers. For each bridge formula $\beta$, computer 104 determines resolvents $\lambda$ of $\alpha \wedge \beta$. Note that the symbol $\lambda$ is used instead of the symbol $\gamma$ here to indicate resolvent $\lambda$ is a candidate but formula that needs to be validated later. For each resolvent $\lambda$, computer 104 constructs a but answer comprising original formula $\alpha$, a but formula $\neg\lambda$, and a bridge formula $\beta$. Block 210 may be followed by block 212.

In block 212, computer 104 validates the but answers. For each but answer K$|\approx$ but $\neg\lambda$ although $\beta$, computer 104 determines if inconsistent knowledge base K non-standardly entails $\neg \lambda$. If so, then the but answer is validated and block 212 may be followed by block 214. When a but answer cannot be validated, block 212 may be followed by block 216.

In block 214, computer 104 saved the but answer. Block 214 may be followed by block 216.

In block 216, computer 104 determines if at least one termination condition has been met.

The process is iterative until at least one termination condition is satisfied. When one validation process is complete or one selection process of bridge formula fails, computer 104 checks the termination condition to determine whether to stop method 200. The termination conditions that may be specified by a user are described as follows.

Stop when finding one but answer. Method 200 is used to increasingly obtain the bridge formulas β and compute the corresponding but answer. Under this termination condition, computer 104 stops method 200 when one but answer is obtained.

Searching in k-level. A user may specify the value of k for selecting bridge formulas β in method 200. Computer 104 then computes all but answers by keeping the degree of searching to no more than level k.

Searching in t time. A user may specify a value t of time. Method 200 begins to compute all but answers. After validating a candidate but answer, computer 104 stops method 200 when the execution time is greater than t.

There are other termination conditions to calculate but answers, and these conditions can be combined.

When at least one termination condition is met, block 216 may be followed by block 218. Otherwise block 216 may loop back to block 208 to select another bridge formula.

In block 218, computer 104 transmits or displays one or more but answers. Each but answer includes original formula α and a but formula $\neg \lambda$, and may further include a bridge formula β.

in the running example, blocks 208A through 216 are illustrated for k=1 and k=2 as follows.

Select bridge formulas for $\mathcal{O} \models$Cow(Dazy). When k=1, filtering process has no effects because there is only α1:=Cow⊑Vegetarian, which can be resolved with α, and α1∧α is not a contradiction. Hence, β:=α1.

As α1 and α only have one resolvent Vegetarian(Dazy), construct candidate $\mathcal{O} \models$Cow(Dazy) but ¬Vegetarian(Dazy) although Cow⊑Vegetarian.

Check O⊨¬Vegetarian(Dazy)? Using method 300, it is determined that $\mathcal{O} \models \neg$Vegetarian(Dazy). Hence, computer 104 returns a but answer of $\mathcal{O} \models$Cow(Dazy) but ¬Vegetarian(Dazy) although Cow⊑Vegetarian.

When k=2, according to the expansion filtering and resolution filtering, only res(α1, α7):=Cow⊑∀eat.¬Animal and res(α1, α7):=Cow⊑∀eat.¬PartofAnimal (Dazy) are selected as bridge formulas.

Construct candidates $\mathcal{O} \models$Cow(Dazy) but ∃eat.Animal (Dazy) although Cow⊑∀eat.¬Animal, and $\mathcal{O} \models$Cow (Dazy) but ∃eat.PartofAnimal(Dazy) although Cow ⊑∀eat.¬PartofAnimal.

Check $\mathcal{O} \models$∃eat.Animal(Dazy)? and $\mathcal{O} \models$∃eat.PartofAnimal(Dazy)? Using method 300, it is determined that $\mathcal{O} \not\models$∃eat.Animal(Dazy) and $\mathcal{O} \models$∃eat.PartofAnimal (Dazy). Hence, a but answer of $\mathcal{O} \models$Cow(Dazy) but ∃eat.PartofAnimal(Dazy) although Cow⊑∀eat. ¬PartofAnimal is obtained.

In every checking point, computer 104 checks the termination condition to determine if method 200 should stop.

FIG. 4 is a block diagram of an illustrative embodiment of a computer program product 400 for implementing a method for determining a but answer to a Boolean query from an inconsistent knowledge base in accordance with one or more embodiments of the present disclosure. Computer program product 400 may include a signal bearing medium 402. Signal bearing medium 402 may include one or more sets of executable instructions 404 that, when executed by, for example, a processor, may be adapted to provide the functionality described above. Thus, for example, computer 104 of FIG. 1 may undertake one or more of the blocks shown in at least FIG. 2 or FIG. 3 in response to instructions 404 conveyed by signal bearing medium 402.

In some implementations, signal bearing medium 402 may encompass a non-transitory computer readable medium 406, such as, but not limited to, a hard disk drive, a Compact Disc (CD), a Digital Versatile Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, computer program product 400 may be wirelessly conveyed by signal bearing medium 402, where signal bearing medium 402 is conveyed by a wireless communications medium 510 (e.g., a wireless communications medium conforming with the IEEE 802.11 standard). Computer program product 400 may be recorded on non-transitory computer readable medium 406 or another similar recordable medium 408.

Figure 5:
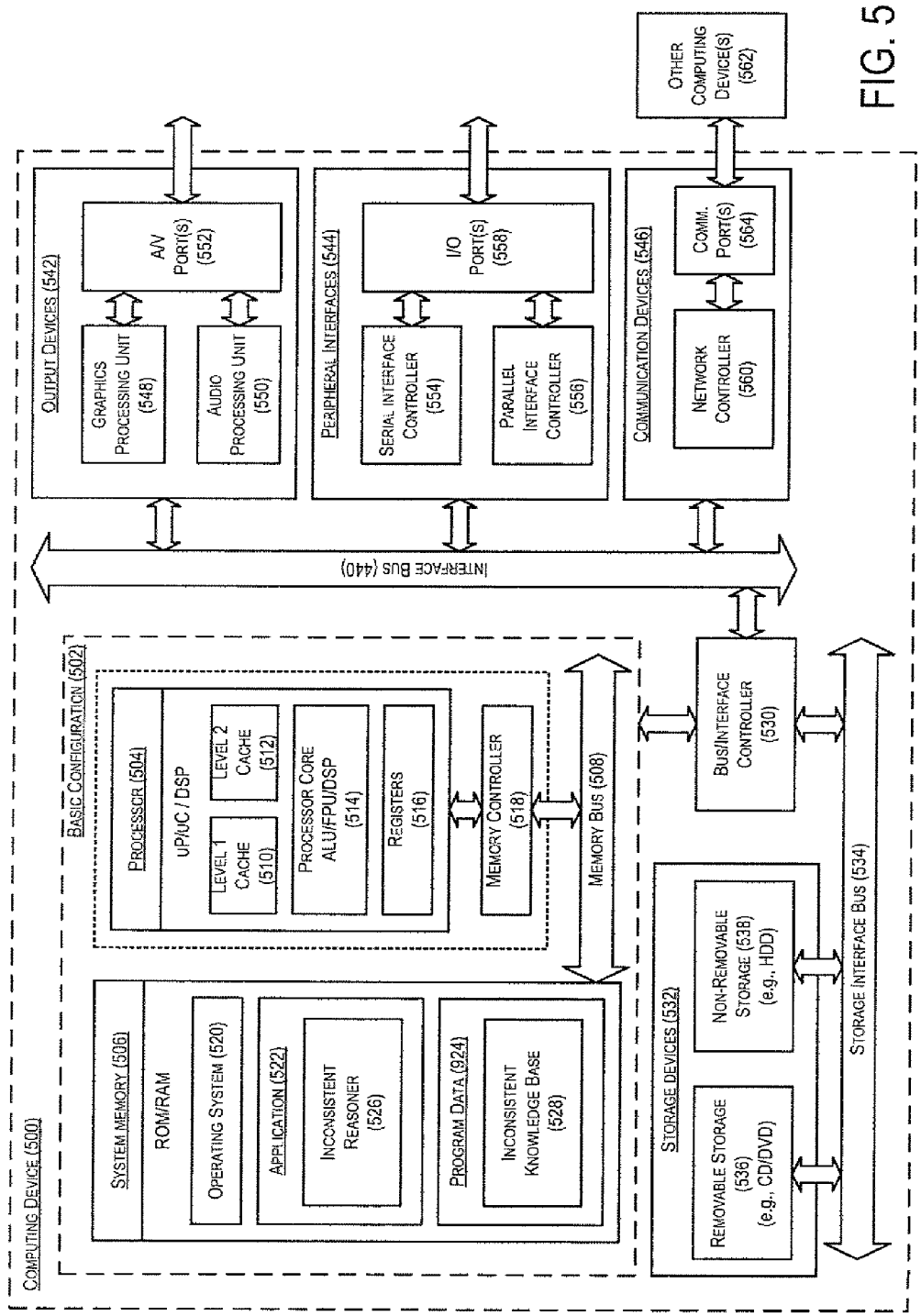
FIG. 5 shows a block diagram of an illustrative computer device, all arranged in accordance with at least some embodiments of the present disclosure.

FIG. 5 is a block diagram illustrating an example computing device 500 that is arranged for but reasoning in accordance with the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include an inconsistent reasonser 526 that is arranged to determine a but answer for a Boolean query. Program data 524 may include inconsistent knowledge base 528 for operation with inconsistent reasonser 526 as is described herein. In some embodiments, application 522 may be arranged to operate with program data 524 on operating system 520 such that implementation of but reasoning may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication fink may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for a processor to respond to a Boolean query using an inconsistent knowledge base, the method comprising:
   receiving the Boolean query including an original formula;
   determining if the inconsistent knowledge base non-standardly entails the original formula;
   when the inconsistent knowledge base non-standardly entails the original formula, selecting a bridge formula that is non-standardly entailed by the inconsistent knowledge base, can be resolved with the original formula, and does not contradict the original formula;
   constructing a but answer comprising the original formula, a but formula, and the bridge formula, the but formula being a negation of a resolvent of the original formula and the bridge formula;
   validating the but answer; and
   transmitting or displaying the but answer with at least the original formula and the but formula.

2. The method of claim 1, wherein the selecting the bridge formula comprises:
   forming the bridge formula as a conjunction of a step number of different clauses in the inconsistent knowledge base;
   determining if the original formula and the bridge formula can be resolved;
   when the original formula and the bridge formula cannot be resolved so the bridge formula is rejected:
      determining if a termination condition is met;
      when the termination condition is not met, incrementing the step number and repeating above steps starting from the forming the bridge formula;
      when the termination condition is met, ending the method;
   when the original formula and the bridge formula can be resolved:
      determining if the original formula and the bridge formula are contradictory;
      when the original formula and the bridge formula are contradictory so the bridge formula is rejected:
         determining if the termination condition is met;
         when the termination condition is not met, incrementing the step number and repeating above steps starting from the forming the bridge formula;
         when the termination condition is met, ending the method;
      when the original formula and the bridge formula are not contradictory, using the bridge formula for the constructing and the validating.

3. The method of claim 2, wherein the selecting the bridge formula further comprises filtering out the bridge formula when the bridge formula is a conjunction including (1) a prior selected bridge formula, (2) a prior rejected bridge formula that is contradictory with the original formula, or (3) two prior rejected bridge formulas that cannot be resolved with the original formula.

4. The method of claim 2, wherein the terminal condition comprises one or more of (1) finding one bridge formula, (2) reaching a terminal value for the step number, and (3) going beyond a time period for executing the method.

5. The method of claim 1, wherein the validating the but answer comprises determining if the inconsistent knowledge base non-standardly entails the but formula, and the but answer is validated when the inconsistent knowledge base non-standardly entails the but formula.

6. The method of claim 1, further comprising, after the validating the but answer:
   determining if a terminal condition is met;
   when the termination condition is not met, repeating above steps starting from the selecting;
   when the termination condition is met, ending the method.

7. The method of claim 6, wherein the terminal condition comprises one or more of (1) finding one bridge formula, (2) reaching a terminal value for the step number, and (3) going beyond a time period for executing the method.

8. The method of claim 1, wherein the transmitting the but answer further includes transmitting the bridge formula with answer and the but formula.

9. The method of claim 1, wherein non-standardly entailment comprises using a resolution-based selection function to determine, from the inconsistent knowledge base, a subset that standardly entails the but formula, wherein the resolution-based selection function is defined as follows:
   $rs(\mathcal{O}, \Phi, 0) = \emptyset$
   $rs(\mathcal{O}, \Phi, 1) = \{\phi \in K | \Phi \text{ and } \phi \text{ directly resolvably relevant}\}$
   $rs(\mathcal{O}, \phi, k) = rs(K, \Phi, k) \cup \{\phi \in K | \Phi \text{ and } \phi \text{ directly resolvably k-relevant with respect to } rs(K, \Phi, k-1)\}$, for $k > 1$.

10. The method of claim 9, wherein the using the resolution-based selection function comprises:
    setting an initial subset and the step value;
    using the resolution-based selection function and the step value to add formulas from the inconsistent knowledge base to the subset, the subset extending the initial consistent subset;
    determining if the subset is consistent;
    when the subset is not consistent:
       removing one or more formulas from the subset to make the consistent subset consistent;
       determining if the subset classically entails the original formula, wherein:

the inconsistent knowledge base non-standardly entails the original formula when the subset standardly entails the original formula;

the inconsistent knowledge base does not non-standardly entail the original formula when the subset does not standardly entail the original formula;

when the subset is consistent:

determining if the subset is a superset of the initial subset, wherein the inconsistent knowledge base does not non-standardly entail the original formula when the subset is not a superset of the initial subset;

when the subset is a superset of the initial subset:

determining if the subset standardly entails the original formula, wherein the inconsistent knowledge base does non-standardly entails the original formula when the subset standardly entails the original formula;

when the subset does not standardly entail the original formula:

setting the subset as the initial consistent subset, incrementing the step value, and repeating above steps starting from the using the resolution-based selection function and the step value.

11. A non-transitory, computer-readable medium encoded with computer-executable instructions for a processor to implement an inconsistent reasoner that responds to a Boolean query using an inconsistent knowledge base, the instructions comprising:

receiving the Boolean query including an original formula;

determining if the inconsistent knowledge base non-standardly entails the original formula;

when the inconsistent knowledge base non-standardly entails the original formula, selecting a bridge formula that is non-standardly entailed by the inconsistent knowledge base, can be resolved with the original formula, and does not contradict the original formula;

constructing a but answer comprising the original formula, a but formula, and the bridge formula, the but formula being a negation of a resolvent of the original formula and the bridge formula;

validating the but answer; and transmitting or displaying the but answer with at least the original formula and the but formula.

12. The non-transitory, computer-readable medium of claim 11, wherein the selecting the bridge formula comprises:

forming the bridge formula as a conjunction of a step number of different clauses in the inconsistent knowledge base;

determining if the original formula and the bridge formula can be resolved;

when the original formula and the bridge formula cannot be resolved so the bridge formula is rejected:

determining if a termination condition is met;

when the termination condition is not met, incrementing the step number and repeating above steps starting from the forming the bridge formula;

when the termination condition is met, ending the method;

when the original formula and the bridge formula can be resolved:

determining if the original formula and the bridge formula are contradictory;

when the original formula and the bridge formula are contradictory so the bridge formula is rejected:

determining if the termination condition is met;

when the termination condition is not met, incrementing the step number and repeating above steps starting from the forming the bridge formula;

when the termination condition is met, ending the method;

when the original formula and the bridge formula are not contradictory, using the bridge formula for the constructing and the validating.

13. The non-transitory, computer-readable medium of claim 12, wherein the selecting the bridge formula further comprises filtering out the bridge formula when the bridge formula is a conjunction including (1) a prior selected bridge formula, (2) a prior rejected bridge formula that is contradictory with the original formula, or (3) including two prior rejected bridge formulas that cannot be resolved with the original formula.

14. The non-transitory, computer-readable medium of claim 12, wherein the terminal condition comprises one or more of (1) finding one bridge formula, (2) reaching a terminal value for the step number, and (3) going beyond a time period for executing the method.

15. The non-transitory, computer-readable medium of claim 11, wherein the validating the but answer comprises determining if the inconsistent knowledge base non-standardly entails the but formula, and the but answer is validated when the inconsistent knowledge base non-standardly entails the but formula.

16. The non-transitory, computer-readable medium of claim 11, further comprising, after the validating the but answer:

determining if a terminal condition is met;

when the termination condition is not met, repeating above steps starting from the selecting;

when the termination condition is met, ending the method.

17. The non-transitory, computer-readable medium of claim 16, wherein the terminal condition comprises one or more of (1) finding one bridge formula, (2) reaching a terminal value for the step number, and (3) going beyond a time period for executing the method.

18. The non-transitory, computer-readable medium of claim 11, wherein the transmitting the but answer further includes transmitting the bridge formula with answer and the but formula.

19. The non-transitory, computer-readable medium of claim 11, wherein non-standardly entailment comprises using a resolution-based selection function to determine, from the inconsistent knowledge base, a subset that standardly entails the but formula, wherein the resolution-based selection function is defined as follows:

$rs(\mathcal{O}, \Phi, 0)=\emptyset$ $rs(\mathcal{O}, \Phi, 1)=\{\phi \in K | \Phi \text{ and } \phi \text{ directly resolvably relevant}\}$ $rs(\mathcal{O}, \Phi, k)=rs(K, \Phi, k) \cup \{\phi \in K | \Phi \text{ and } \phi \text{ directly resolvably k-relevant with respect to } rs(K, \Phi, k-1)\}$, for $k>1$.

20. The non-transitory, computer-readable medium of claim 19, wherein the using the resolution-based selection function comprises:

setting an initial subset and the step value;

using the resolution-based selection function and the step value to add formulas from the inconsistent knowledge base to the subset, the subset extending the initial consistent subset;

determining if the subset is consistent;

when the subset is not consistent:

removing one or more formulas from the subset to make the consistent subset consistent;

determining if the subset classically entails the original formula, wherein:

the inconsistent knowledge base non-standardly entails the original formula when the subset standardly entails the original formula;

the inconsistent knowledge base does not non-standardly entail the original formula when the subset does not standardly entail the original formula;

when the subset is consistent:

determining if the subset is a superset of the initial subset, wherein the inconsistent knowledge base does not non-standardly entail the original formula when the subset is not a superset of the initial subset;

when the subset is a superset of the initial subset:

determining if the subset standardly entails the original formula, wherein the inconsistent knowledge base does non-standardly entails the original formula when the subset standardly entails the original formula;

when the subset does not standardly entail the original formula:

setting the subset as the initial consistent subset, incrementing the step value, and repeating above steps starting from the using the resolution-based selection function and the step value.

\* \* \* \* \*